United States Patent [19]

Sonneborn

[11] Patent Number: 4,545,408

[45] Date of Patent: Oct. 8, 1985

[54] SEAL FOR A ROTARY HYDRAULIC VALVE

[75] Inventor: Lamburtus J. Sonneborn, Oldenzaal, Netherlands

[73] Assignee: Applied Power, Inc., Milwaukee, Wis.

[21] Appl. No.: 680,221

[22] Filed: Dec. 7, 1984

Related U.S. Application Data

[63] Continuation of Ser. No. 415,231, Sep. 7, 1982, abandoned.

[51] Int. Cl.[4] .............................................. F16K 5/14
[52] U.S. Cl. ............................... 137/625.46; 251/175; 251/180; 277/27; 277/75; 277/205
[58] Field of Search ........... 137/861, 876, 287, 625.46; 251/175, 181, 175, 180; 277/75, 205, 217 R, 217 C, 27

[56] References Cited

U.S. PATENT DOCUMENTS

| | | | |
|---|---|---|---|
| 2,465,175 | 3/1949 | Schwarz | 277/205 |
| 2,686,402 | 8/1954 | Samuel | 277/205 X |
| 2,840,109 | 6/1958 | Wadleight | 251/175 X |
| 2,970,805 | 2/1961 | Pool | 251/175 |
| 3,527,507 | 9/1970 | Clark | 277/205 X |
| 3,550,628 | 12/1970 | Warner | 137/625.46 |
| 3,865,139 | 2/1975 | Toluai | 251/175 X |
| 3,967,811 | 7/1976 | Keller | 251/175 |
| 3,981,330 | 9/1976 | Watts | 251/175 X |
| 4,132,388 | 1/1979 | Billeter | 251/175 |

Primary Examiner—Harold W. Weakley
Attorney, Agent, or Firm—John J. Byrne; Bradford E. Kile; Kevin M. O'Brien

[57] ABSTRACT

Disclosed is a seal for a rotary hydraulic valve having an inner surface which is concave and spaced from the recess in the rotary core in which it is received. Two parallel troughs are formed in the inner surface between the edges thereof and the central flow passageway. In use, fluid under pressure enters the trough and distorts the seal both radially outwardly against the valve body and circumferentially outwardly against the sides of the seal recess.

1 Claim, 4 Drawing Figures

SEAL FOR A ROTARY HYDRAULIC VALVE

This application is a continuation of application Ser. No. 415,231, filed Sept. 7, 1982, now abandoned.

FIELD OF THE INVENTION

This invention relates to a seal for a rotary valve. In particular, it relates to such a seal in which the pressure of the fluid being valved is used to stress the seal into engagement with the valve parts.

BACKGROUND OF THE INVENTION

Seals of the type involved here are used in hydraulic valve devices comprising a housing having a valve body movable in a bore therein. A plurality of apertures opening into the bore are provided in the wall of the housing, said apertures being adapted to communicate with a conduit provided in the valve body and opening into the peripheral surface thereof, dependent on the position of the valve body. An annular sealing means is provided in the counter-bored conduit mouth, and the sealing means is in engagement with the bore wall.

Such a hydraulic valve device is known from the German Gebrauchsmuster No. 7408649. The application of a sealing means in the transition(s) of the aperture(s) between the housing and the mouth(s) of the conduit in the valve body has the advantage that a relatively large clearance is acceptable between the bore wall and the valve body without this being at the cost of the leak tightness of the valve device, as is the case with other known constructions without such a sealing means. A larger clearance means larger manufacturing tolerances and therefore cheaper manufacture, while the valve body may more easily be actuated with a larger clearance than with a narrow clearance of the valve body in the bore. In the known construction according to the above mentioned Gebrauchsmuster, the sealing means is composed of two parts: an annulus of relatively hard material engaging the bore wall and an annulus of relatively elastic material which in prestressed condition is received in the counter-bore of the conduit mouth in the valve body and pushes the first mentioned annulus outwardly against the bore wall.

SUMMARY OF THE INVENTION

A seal for a rotary hydraulic valve according to the present invention has an inner surface which is concave and spaced from the recess in the rotary core in which it is received. Two parallel troughs are found in the inner surface between the edges thereof and the central flow passageway. In use, fluid under pressure enters the troughs and distorts the seal both radially outwardly against the valve body and circumferentially outwardly against the sides of the seal recess.

DETAILED DESCRIPTION OF THE PRESENTLY PREFERRED EMBODIMENT

Figure 1:
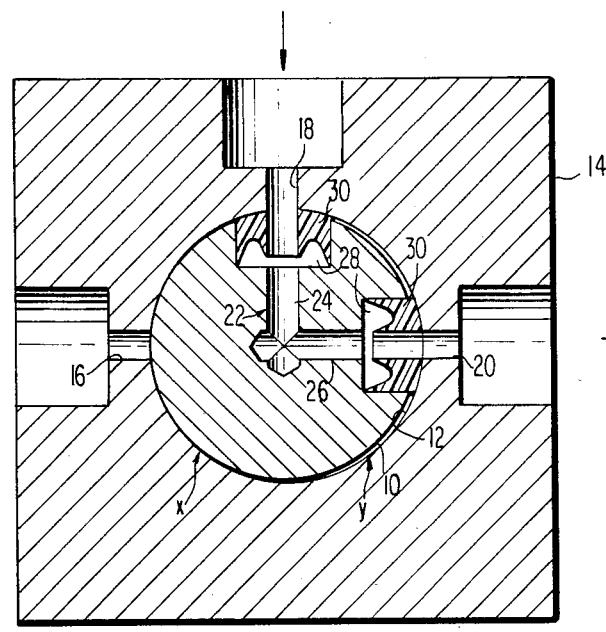
FIG. 1 is a cross-section through a hydraulic valve device according to the invention.
Figure 2:
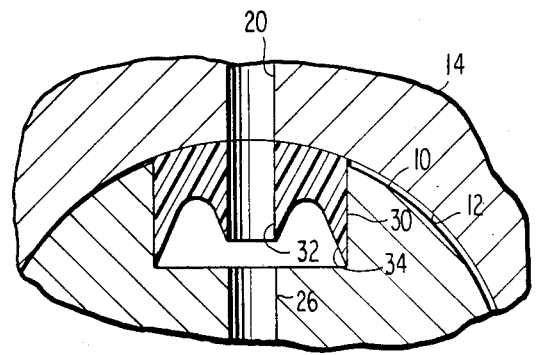
FIG. 2 shows a section on enlarged scale of a detail of the valve device according to FIG. 1.
Figure 4:
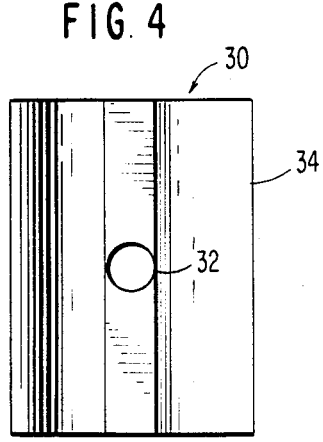
FIG. 4 is a plan view of the sealing means in the unstressed condition.
Figure 3:
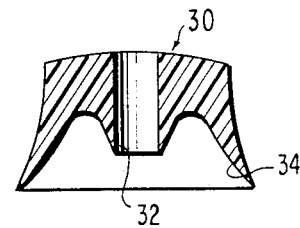
FIG. 3 is a cross-section through the sealing means in unstressed condition.

In the embodiment shown in the drawings, the substantially cylindrical valve body 10 is rotatably received in the bore 12 of the valve housing 14. The housing 14 in this example has three apertures 16, 18, and 20, the aperture 18 being adapted for communication with a source of hydraulic fluid. By means of the valve device, the hydraulic fluid supplied to the aperture 18 may be selectively passed through to either the aperture 16 or the aperture 20, the apertures 16 and 20 being adapted to be connected to a working device, such as a hydraulic piston-cylinder device. For this purpose the valve body 10 has a conduit 22 comprising two intersecting radial bores 24 and 26 respectively, said conduit opening at the valve cylinder periphery at two positions which are mutually spaced at 90°. The conduit is counter-bored at both opening positions. In each of the cylindrical counterbores 28, a sealing means 30 made of a polyamide such as Nylon-6 is received.

The sealing means 30 is provided with a central through-going passageway 32. One head wall of the sealing means 30 is adapted to the curvature of the wall of the bore 12 and the other head wall is annularly recessed such that at the periphery a lip 34 extending in the axial direction has been formed.

In the unstressed condition, the peripheral lip 34 may be somewhat conical in shape so that, when mounting the seaing means 30 in the counter-bore 28, the lip 34 is moved somewhat inwardly so that the sealing means 30, as seen in the radial direction, engages the peripheral wall of the counter-bore 28 in a somewhat pre-stressed condition. The axial dimension of the sealing means 30 furthermore is such that the axial direction (or the radial direction relative to the valve cylinder 10) of the sealing means 30 is also enclosed in prestressed condition between the bottom of the counter-bore 28 and the wall of the bore 12.

As shown in the drawings, there is a relatively large clearance between the bore 12 and the valve body 10. It may be seen in the drawings that the head surface of the sealing means 30 remote from the bore wall is for the greater part freely exposed so that the pressure prevailing in the conduit 22 may act thereon. Accordingly, a radially outwardly directed force, as seen relative to the valve body 10, is imparted to the sealing means 30, pressing the sealings means 30 into engagement with the bore wall. Simultaneously the peripheral lip 34 is pressed into engagement with the peripheral wall of the counter-bore 28 by the pressure. It will be clear that, when the valve body 10 is rotated to the left through 90° from the position of FIG. 1, the apertures 16 and 18 are mutually connected. Simultaneously therewith, the clearance between the bore 12 and the valve body 10 is displaced such that the contact point between both moves from position x to position y.

As the material for the integral sealing means, a polyamide, e.g. such as the polyamide known under the name "Nylon-6", is suitable. Such a material has a certain compressibility so that the sealing means in combination with the flexible character of the head wall of the means at its end remote from the bore wall may be mounted in prestressed condition. However, such material on the other hand has sufficient wear resistance along the bore wall.

Due to the particular structure or shaping of the sealing means 30, the sealing means 30 is pushed more strongly into engagement with the bore wall or the wall of the counter-bore of the conduit mouth as the pressure in the aperture or the conduit increases. Under the influence of this pressure, the flexible lip 34 is pressed in the radial direction against the counter-bore wall while, at the same time, a force is imparted to the annular surface of the sealing means situated within the lip around the central passageway 32 of the sealing means 30 which forces the sealing means 30 against the bore wall. By forming the sealing means 30 as an integral piece, manufacture is, moreover, simpler and therefore cheaper than in the known construction.

I claim:

1. A hydraulic rotary valve comprising:
   a housing having an internal bore and a plurality of apertures opening into said bore;
   a valve body positioned in said bore and rotatable therein;
   a flow conduit located in said valve body such that said conduit communicates with a plurality of said apertures when said valve is in an operable flow position;
   a longitudinally extending seal retaining means located at each end of said conduit and forming a pair of recessed areas in said valve body; and
   a longitudinally extending elongate fluid seal located within each of said longitudinally extending recessed areas in said valve body, each of said seals having
   a central passageway for the flow of fluid to be valved positioned transverse to the direction of longitudinal extent of said seal
   a first seal surface extending generally perpendicular to said central passageway and having an arcuate sealing configuration compatable with a wall of the internal bore of said housing, said first surface being adapted to function as a sealing surface when said seal is in use,
   second and third longitudinally extending seal surfaces located on either side of said central passageway and extending from said passageway in a concavely arcuate direction,
   a fourth longitudinally extending elongate surface extending from said second surface and forming a first leg of said seal, and
   a fifth longitudinally extending surface extending from said third surface and forming a second leg of said seal, wherein said fourth and fifth surfaces are trough-shaped and said first and second legs of said seal are tapered, and wherein said seal is axially wider in a relaxed condition than said retaining means and is positioned in said retaining means in a pre-stressed condition, such that when pressurized fluid is passed from said conduit within said valve body and through said central passageway of said seal to an aperture in said housing, said first and second legs of said seal form a sealing relationship with said valve body and said first surface forms a sealing relationship with the wall of the bore of said housing to prevent leakage of pressurized fluid within said hydraulic rotary valve.

* * * * *